United States Patent [19]
Balogh et al.

[11] 4,389,788
[45] Jun. 28, 1983

[54] APPARATUS AND METHOD FOR MEASURING ROLL DIAMETERS

[75] Inventors: Louis J. Balogh; Raymond L. Fitzhugh, both of Akron; Dale S. Kimes, Wadsworth; Myron Weinstein, Munroe Falls, all of Ohio

[73] Assignee: The Goodyear Tire & Rubber Company, Akron, Ohio

[21] Appl. No.: 290,845

[22] Filed: Aug. 7, 1981

[51] Int. Cl.³ .............................. G01B 5/08; G01B 7/12
[52] U.S. Cl. ................................. 33/178 D; 33/178 E
[58] Field of Search ........................ 33/178 E, 178 D

[56] References Cited

U.S. PATENT DOCUMENTS

| 3,274,693 | 9/1966 | Witzke | 33/174 R |
| 4,141,149 | 2/1979 | George et al. | 33/178 D |
| 4,176,461 | 12/1979 | Gebel et al. | 33/178 D |

FOREIGN PATENT DOCUMENTS

| 680704 | 5/1930 | France | 33/178 D |
| 52-3779 | 1/1977 | Japan | 33/178 D |
| 6601582 | 8/1967 | Netherlands | 33/178 D |

OTHER PUBLICATIONS

Kirstens "Mikrokar" Saddle Support Feeler Gauge, Jul. 23, 1962.

Primary Examiner—Richard R. Stearns
Attorney, Agent, or Firm—F. K. Lacher; T. P. Lewandowski

[57] ABSTRACT

The diameter of a generally cylindrical roll is accurately measured by holding a gauge against the surface of an arc of the roll, determining the approximate variation in diameter from a standard diameter with a primary sensor located between two supports and determining corrections to the approximate variation in diameter through secondary sensors located adjacent to the supports. The gauge supports also indicate misalignment of the central plane of the gauge with a circumferential plane of the roll by lack of contact of the supports with the roll surface and by measurements of the secondary sensors over a predetermined amount.

12 Claims, 3 Drawing Figures

APPARATUS AND METHOD FOR MEASURING ROLL DIAMETERS

This invention relates to the measurement of roll diameters. More particularly, this invention relates to apparatus and methods for measuring variations in cylindrical roll diameters from a standard diameter to determine the crown of the rolls.

Large diameter cylindrical rolls are often used in industrial applications. For example, three 24-inch cylindrical rolls may be used to calender tire cord fabric and it is desirable to measure the crown of the rolls without removing them from the calender. In such a case only a portion of the arc of a roll may be accessible for applying a gauging instrument thereto. Although the approximate diameter of a roll may be known, it is usually desirable to measure the diameter of such a roll to a very precise figure such as to the nearest thousandth of an inch. It may also be desirable to determine the variations in diameter along the length of a roll. For example, this is important in a calender because if the rolls vary in diameter along their length, the gauge of the coated cord fabric processed by the calender may also vary across its width.

Apparatus for measuring roll diameters used heretofore has included sensing devices which weigh several pounds. If several measurements are being made on a roll with such an apparatus the operator's arms may become fatigued. As a result, the pressure applied by the operator against the roll may vary from one measurement to another. This will result in errors in the measurements if the readings are not otherwise corrected for such pressure variance.

It is an object of this invention to provide an apparatus and method for measuring a variation in roll diameter wherein a correction is made for variable pressures so as to provide more precise measurements.

It is another object of this invention to provide an apparatus and method for accurately determining the variations in diameter along the length of a substantially cylindrical object.

Other objects of this invention will be made apparent hereinafter.

In accordance with one aspect of the invention, apparatus is provided for measuring the variation in diameter of a generally cylindrical body comprising a frame member having spaced-apart support means for engaging the surface of the cylindrical body, a primary sensor positioned between the support means on the frame member to determine the position of the surface of the cylindrical body relative to the frame member at a first point for measuring the approximate variation in diameter of the body, and at least one secondary sensor positioned on the frame member adjacent one of the support means to determine the position of the surface of the cylindrical body relative to the frame at a second point for measuring a correction to the approximate diameter variation measurement.

In accordance with another aspect of the invention a method of measuring the variation in diameter of a generally cylindrical body is provided comprising holding a frame member against a cylindrical surface of the body with spaced-apart support means in engagement with the surface, determining the position of the surface relative to the frame member at a first point on the surface by a primary sensor at a location between the support means for measuring the approximate variation in diameter of the body, determining the position of the surface relative to the frame member at a second point on the surface by a secondary sensor at a location adjacent at least one of the support means for measuring a correction to the approximate variation in diameter of the body, and correcting the measurement of the approximate variation in diameter of the body by subtracting the measurement of the correction to obtain a precise measurement of the variation in diameter.

To acquaint persons skilled in the arts most closely related to the present invention, a certain preferred embodiment thereof illustrating a best mode now contemplated for putting the invention into practice is described herein by and with reference to the annexed drawings forming a part of the specifications. The embodiment shown and described herein is illustrative and, as will become apparent to those skilled in these arts, can be modified in numerous ways within the spirit and scope of the invention defined in the claims hereof.

Figure 1:
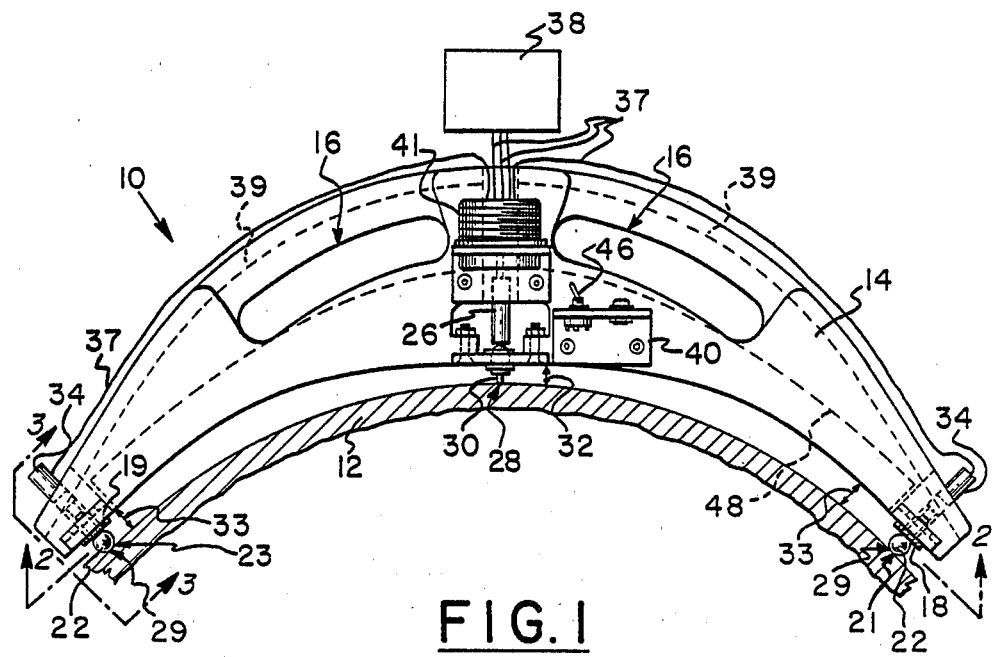
FIG. 1 is a partially schematic elevation of an apparatus embodying this invention applied to a cylindrical body shown in section with parts being broken away.

Referring to the drawings, there is shown a measuring apparatus such as measuring gauge 10 embodying this invention for measuring the variations in diameter of a cylindrical body such as roll 12. The gauge 10 is provided with a frame 14 shaped generally to conform to the curvature of the roll 12 to be measured, and may be provided with a pair of hand-holds 16 to facilitate holding the gauge against the surface of the roll to be measured.

In order to obtain accurate measurements of the variations in diameter of the roll 12, a central plane 13 of the frame 14 is aligned with circumferential plane 17 of the roll 12; that is, a plane perpendicular to the longitudinal axis of the roll 12. To provide such alignment, the frame 14 is provided with first and second frame extension members such as support bars 18 and 19, respectively, which contact the surface of the roll 12 at support bar contact points 21 and 23, respectively. The support bars 18 and 19 are preferably spaced apart as shown in FIG. 1 over an arc corresponding to a predetermined segment of the roll circumference which may be between one-twelfth and five-twelfths of the circumference of the roll 12.

Figure 3:
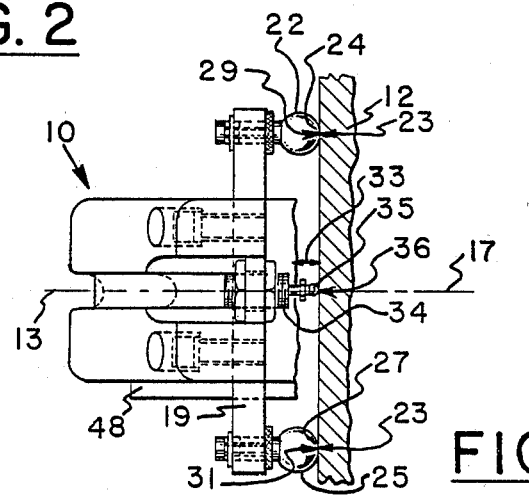
FIG. 3 is an end view of the apparatus taken along line 3—3 in FIG. 1.

Each of the support bars 18 and 19 may be engageable with the roll 12 at two or more locations on the roll surface as is clearly shown for support bar 19 in FIG. 3. In this embodiment, each of the support bars 18 and 19 has a pair of support elements such as substantially incompressible hardened steel balls 22 and 25 attached to the bars. These steel balls 22 and 25 have roll contact portions 24 and 27, respectively, which contact the surface of the roll 12 at points 29 and 31, respectively, and which are positioned on the support bars 18 and 19 so that they will be spaced apart in the longitudinal direction of the roll when the frame 14 is aligned on the roll. The hardened steel balls 22 and 25 are positioned relative to each other in planes perpendicular to the central plane 13 such that each of them contacts the surface of the roll 12 when there is correct alignment of the frame 14 on the roll. Preferably the balls 22 and 25 are spaced from the central plane 13 a distance not greater than 20 percent or less than one percent of the arc between the balls at each end of the frame 14.

Figure 2:
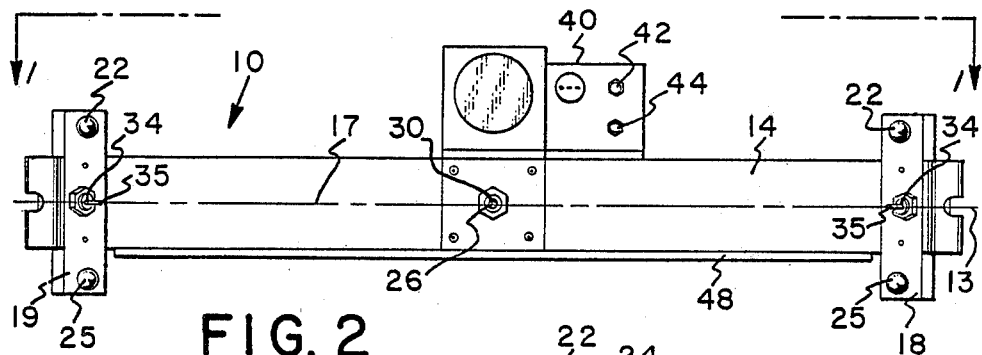
FIG. 2 is a bottom view of the apparatus taken along line 2—2 in FIG. 1.

Misalignment of the frame 14 may be indicated to the operator when the hardened steel balls 22 and 25 do not all contact the surface of the roll 12. As illustrated in FIGS. 2 and 3, the frame 14 is aligned with the central plane 13 of the frame in alignment with the circumferential plane 17 of the roll 12. Both the ball contact points 29 and 31 are axially aligned and the central plane 13 passes midway between each respective pair thereof. This invention, however, is not limited to a pair of hardened steel balls 22 and 25 at each end of the frame 14 for alignment of the frame on the roll 12. Other types of frame extension members such as shoes contoured to the shape of the roll surface may be provided to accomplish the same purpose, and such other frame extension members are meant to come within the scope of this invention.

A primary sensor 26 is attached to the frame 14 in the central plane 13 between the support bars 18 and 19 and, as shown in FIGS. 1 and 2, it contacts the surface of the roll 12 or otherwise measures the proximity of the frame to the roll surface at a first point 28 in the circumferential plane 17. This provides a measurement corresponding approximately to the variation in diameter of the roll 12 at that first point. In order to provide sufficiently accurate measurements of the variation in roll diameter, the primary sensor 26 is attached to the frame 14 such that the sensor is spaced from each of the support bars 18 and 19 a distance along the roll surface which is equal to at least one-third of the roll circumference which corresponds to the arc over which the support bar contact points 21 and 23 are spaced apart. Preferably, the first point of contact 28 by the primary sensor 26 is located midway between the support bar contact points 21 and 23 and in circumferential plane 17 to provide the greatest degree of accuracy. It is, however, sufficient for the purposes of this invention that the first point of contact 28 by the primary sensor 26 be located in any circumferential plane in which the frame 14 is aligned. In the gauge 10 of the drawings, the frame 14 is illustrated as being aligned in each successive circumferential plane of the roll 12 passing between ball contact points 29 and 31 of the respective support bars 18 and 19.

During use of the gauge 10, the support bars 18 and 19 may be pressed into the surface of the roll 12 to a greater or lesser degree in terms of thousandths of an inch depending upon the amount of force being applied at the time of measurement. It has been found that the accuracy of the resulting measurements to determine the variations in diameter made by the primary sensor 26 is not adequate when the measurements are not corrected for the differences in the amount of applied force.

In accordance with this invention, there is provided at least one, but preferably two, secondary sensors 34 which are attached to the frame 14 and positioned thereon to contact the roll 12 or otherwise measure the proximity of the frame to the roll surface. This measurement provides an indication of the degree to which the support bars 18 and 19 are pressed into the roll surface during operation of the primary sensor 26. With this measurement the amount of force applied by the gauge 10 against the roll 12 for correction of the approximate variation in diameter is obtained. Each secondary sensor 34 is positioned on the frame 14 to measure the proximity of the frame to the roll surface at a second point 36 associated with respective support bar contact points 21 or 23.

In order to provide a sufficiently accurate measurement compensating for the degree to which the support bars 18 or 19 are pressed into the roll surface, the respective secondary sensors 34 are attached to the frame 14 such that the second points of contact 36 by the secondary sensors 34 are located a distance along the roll surface from the respective support bar contact points 21 or 23 which is equal to not more than 20 percent or less than one percent of the arc between support bars 18 and 19. It has been found that where the support bar contact points 21 or 23 are too close to the second contact points 36 of the secondary sensors 34 it is difficult to align the frame 14 with the central plane 17. On the other hand, where the points 21 or 23 are spaced too far away from the second points 36, the secondary sensors 34 are not positioned relative to the plane 17 containing the primary sensor 26 so that the variation in diameter from the standard diameter can be accurately determined. Preferably, each second point 36 is in the circumferential plane 17 and circumferentially aligned with the respective support bar contact points 21 or 23 to provide the greatest degree of accuracy.

Any number of measuring devices may be used as primary and secondary sensors 26 and 34, respectively, to measure the proximity of the frame 14 to the surface of the roll 12. Examples of such devices include, but are not limited to, linear potentiometers, magnetic interaction devices, and position transducers. The type of position transducer known as a "linear variable differential transformer" is utilized for each of the primary and secondary sensors 26 and 34, respectively, in accordance with a preferred embodiment of this invention. Such a transducer produces an output voltage proportional to the displacement of a separate movable rod-shaped magnetic core. Three coils may be equally spaced in an axial direction on a cylindrical coil form and the core positioned axially inside the coil assembly to provide a path for magnetic flux linking the coils. When the primary or center coil is energized with alternating current, voltages are induced in the outer coils. When the core is in a center position, the output voltage is zero. As the core is moved from the center position, the induced voltage in the outer coil toward which the core is moved is increased while the voltage in the other outer coil is decreased to provide a differential voltage output which varies linearly with changes in core position.

With the frame 14 aligned with the roll 12, a magnetic core 30 of primary sensor 26 will touch the roll 12 and thereby assume a position which is related to the diameter of the roll at the first point 28. The core 30 is movable as described above in a direction toward or away from the roll axis as illustrated at 32 in FIG. 1 to vary the output voltage which may then be converted to a measurement of the variation in roll diameter from a standard diameter by utilizing principles which are of common knowledge to those of ordinary skill in the art to which this invention applies.

Simultaneously with the measuring of the variation in roll diameter by the primary sensor 26, the secondary sensors 34 provide a displacement measurement related to the amount of force being applied. Magnetic cores 35 of secondary sensors 34 are movable as described above in a direction toward or away from the roll axis as illustrated at 33 in FIGS. 1 and 3. Movement of cores 35 results in output voltages of the secondary sensors 34 which are relative to the amount the respective support bars 18 and 19 are pressed into the roll surface. These output voltages may then be converted to a measurement related to the degree to which the respective frame extension members 18 and 19 are pressed into the roll surface utilizing principles which are of common knowledge to those of ordinary skill in the art to which this invention applies.

The gauge 10 may be calibrated with a standard roll of a standard known diameter by adjusting the sensors 26 and 34 for zero indication of diameter variation in accordance with principles known to those of ordinary skill in the art to which this invention applies.

Both the primary sensor 26 and secondary sensors 34 provide inputs corresponding to their respective measurements through wires 37 which may extend through slots 39 to connector box 41 and then to an indicator circuit illustrated schematically at 38. (For purposes of clearer illustration, wires 37 are not shown in the slots 39 but are shown outside the frame 14.) The indicator circuit 38 combines these inputs mathematically and provides an output such as a digital readout which corresponds to the diameter variation measurement provided by the primary sensor 26 corrected by the force adjustment measurements provided by the secondary sensors 34. The indicator circuit 38 may be designed and constructed utilizing principles commonly known to persons of ordinary skill in the art to which this invention applies.

It is apparent that is the frame 14 is properly aligned with the roll 12, the values of the measurements provided by the secondary sensors 34 will vary only over a small range such as a few thousandths of an inch. In a preferred embodiment of this invention, alignment sensing means 40 for indicating misalignment of the gauge 10 on a substantially cylindrical object is provided. Such sensing means 40 may comprise a circuit which provides a warning signal when the value of a measurement provided by the secondary sensors 34 is greater than a predetermined amount such as ten thousandths of an inch so that the operator can correct the alignment of the frame 14 on the roll 12. Referring to FIG. 2, a red indicating light 42 and a green indicating light 44 are provided to indicate misalignment and correct alignment, respectively. Referring to FIG. 1, switch 46 is provided to allow the operator to lock in a measurement signal when the gauge 10 is correctly aligned.

As a series of measurements are being made along the length of the cylindrical roll 12, an error may occur due to expansion of the frame 14 because of heat from the body of the operator or otherwise if the frame is made of a material such as aluminum which has a high coefficient of expansion. Therefore, the frame 14 of the gauge 10 is preferably composed substantially of a material which has a coefficient of linear expansion per centigrade degree equal to less than about 0.000012. For example, the frame 14 may be composed substantially of wood which has a coefficient of linear expansion generally in the range of 0.000003 to 0.000007 per centigrade degree. Even though the frame 14 is composed substantially of a material such as wood with a low coefficient of expansion, it may also have relatively small parts of metal such as support bars 18 and 19 and a reinforcing member 48 extending over the arc of the frame and out of contact with the hands of the operator to provide rigidity to the frame and prevent flexing during operation so that greater accuracy can be achieved.

In accordance with this invention, the approximate variation in diameter of the roll 12 may be determined through the use of the primary sensor 26 which has the core 30 touching the surface of the roll. At the same time at least one of the secondary sensors 34 has a core 35 touching the surface of the roll 12 to obtain a measurement corresponding to the amount of force applied. The approximate measurement of the variation in diameter of the roll 12 is corrected by applying the measurement made by the secondary sensors 34. The measurements are combined utilizing mathematical principles of common knowledge to those having ordinary skill in the art to which this invention applies to provide a composite measurement value for correction of the approximate variation in diameter measurement.

For example, if the support bar contact points 21 and 23 are equidistant from the first contact point 28 of the primary sensor 26 and each of the second contact points 36 of the secondary sensors 34 is in the circumferential plane 17 and axially aligned with the respective support bar contact point 21 or 23, then the measurements of the secondary sensors 34 can be averaged and applied to the approximate measurement of diameter variation. If the measurement of the approximate diameter variation is 0.006 inch and the measurements of the secondary sensors 34 are +0.002 inch and +0.008 inch, then their average of +0.005 inch would be subtracted from the approximate diameter variation measurement of 0.006 inch resulting in a corrected diameter variation measurement of 0.001 inch. The cores 35 of the secondary sensors 34 are set so that when there is zero output voltage there is no pressing of the balls 22 and 25 into the roll surface and the approximate variation in roll diameter is the actual variation in roll diameter. However, the output voltage increases as pressure is applied and there is pressing of the balls 22 and 25 against the roll surface. This output voltage indicates the measurements by the secondary sensors 34.

In accordance with this invention, diameter variations along the length of the substantially cylindrical roll 12 may be determined by obtaining corrected measurements of diameter variations from a standard diameter at each of at least two locations along the length thereof in the above-described manner. The difference between these measurements is a measurement of diameter variations or the amount of crown between the locations where the measurements are obtained.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for measuring the variation in diameter of a generally cylindrical body comprising:
   a frame member having spaced-apart support means for engaging the surface of said cylindrical body,
   a primary sensor positioned between said support means on said frame member to determine the position of the surface of said cylindrical body relative to said frame member at a first point for measuring the approximate variation in diameter of said body, and
   at least one secondary sensor positioned on said frame member adjacent one of said support means to determine the position of the surface of said cylindrical body relative to said frame at a second point for measuring a correction to the approximate diameter variation measurement.

2. Apparatus according to claim 1 wherein another secondary sensor is positioned on said frame member adjacent the other of said support means to determine the position of said cylindrical surface relative to said frame member at another second point for measuring a further correction to the approximate diameter variation measurement.

3. Apparatus according to claim 2 wherein said primary sensor and said secondary sensors are positioned in a central plane of said frame member for engagement with the surface of said cylindrical body at said first and second points.

4. Apparatus according to claim 3 wherein lack of said support means includes at least a first support element on one side of said central plane and a second support element on the other side of said central plane for supporting said frame on said cylindrical body at spaced-apart points axially of said body and said primary sensor and said secondary sensors being positioned in said central plane.

5. Apparatus according to claim 4 wherein said support elements are positioned for contact of all of said elements with said roll surface when said central plane of said frame member is in alignment with said circumferential plane of said cylindrical body.

6. Apparatus according to claim 5 wherein said support elements are spaced from said central plane a distance not greater than 20 percent or less than one percent of the arc between support elements at each end of said frame member so that when said central plane of said frame member is not in alignment with said circumferential plane of said body the measurements by said secondary sensor will be of a sufficient magnitude to indicate misalignment of said central plane with said circumferential plane.

7. Apparatus according to claim 4 wherein said first and second support elements are mounted on a support bar of said frame member at positions in a plane perpendicular to said central plane.

8. Apparatus according to claim 2 wherein the distance between said secondary sensors is equal to an arc along the circumference of said cylindrical body equal to between one-twelfth and five-twelfths of the circumference of said body in a circumferential plane.

9. Apparatus according to claim 1 wherein an indicator circuit is provided which receives inputs corresponding to the measurements of said primary and secondary sensors and provides an output which corresponds to the measurement of the diameter variation provided by said primary sensor corrected by the measurements provided through said secondary sensor.

10. A method of measuring the variation in diameter of a generally cylindrical body comprising:
holding a frame member against a cylindrical surface of said body with spaced-apart support means in engagement with said surface,
determining the position of said surface relative to said frame member at a first point on said surface by a primary sensor at a location between said support means for measuring the approximate variation in diameter of said body,
determining the position of said surface relative to said frame member at a second point on said surface by a secondary sensor at a location adjacent at least one of said support means for measuring a correction to the approximate variation in diameter of said body, and
correcting the measurement of said approximate variation in diameter of said body by subtracting the measurement of said correction to obtain a precise measurement of the variation in diameter.

11. A method according to claim 10 wherein a central plane of said frame member is moved into alignment with a circumferential plane of said cylindrical body prior to determining the position of the body surface relative to said frame with said primary sensor.

12. The method according to claim 11 wherein said alignment is determined by a measurement indication of said secondary sensor greater than a predetermined amount.

* * * * *

UNITED STATES PATENT OFFICE
CERTIFICATE OF CORRECTION

Patent No. 4,389,788        Dated June 28, 1983

Inventor(s) Louis J. Balogh, Raymond L. Fitzhugh Dale S. Kimes, and Myron Weinstein It is certified that error appears in the above-identified patent and that said Letters Patent are hereby corrected as shown below:

Column 7, line 15, "lack of" should read --each of--.

Signed and Sealed this

Twenty-ninth Day of November 1983

[SEAL]

Attest:

GERALD J. MOSSINGHOFF

Attesting Officer     Commissioner of Patents and Trademarks